(12) United States Patent
Singh et al.

(10) Patent No.: US 8,879,506 B1
(45) Date of Patent: Nov. 4, 2014

(54) METHOD AND APPARATUS FOR DYNAMICALLY SCHEDULED TUNEAWAY

(71) Applicant: Sprint Spectrum L.P., Overland Park, KS (US)

(72) Inventors: Jasinder P. Singh, Olathe, KS (US); Maulik K. Shah, Overland Park, KS (US); Deveshkumar N. Rai, Overland Park, KS (US); Sachin R. Vargantwar, Macon, GA (US)

(73) Assignee: Sprint Spectrum L.P., Overland Park, KS (US)

( * ) Notice: Subject to any disclaimer, the term of this patent is extended or adjusted under 35 U.S.C. 154(b) by 113 days.

(21) Appl. No.: 13/663,022

(22) Filed: Oct. 29, 2012

(51) Int. Cl.
 *H04W 36/14* (2009.01)
 *H04W 88/06* (2009.01)
 *H04W 36/00* (2009.01)
 *H04W 48/18* (2009.01)

(52) U.S. Cl.
 CPC ...... *H04W 36/0016* (2013.01); *H04W 36/0088* (2013.01); *H04W 88/06* (2013.01); *H04W 48/18* (2013.01)
 USPC .......................................................... 370/331

(58) Field of Classification Search
 CPC . H04W 88/06; H04W 72/1215; H04W 72/02; H04W 48/18; H04W 36/0016; H04W 36/0088
 USPC ........... 370/328, 329, 280, 331; 455/436, 443
 See application file for complete search history.

(56) References Cited

U.S. PATENT DOCUMENTS

| | | | |
|---|---|---|---|
| 8,369,853 B1 * | 2/2013 | Sarkar et al. .................. | 455/436 |
| 2007/0099619 A1 | 5/2007 | Parekh et al. | |
| 2009/0117891 A1 | 5/2009 | Chou | |
| 2011/0044300 A1 * | 2/2011 | Joshi et al. ..................... | 370/336 |
| 2012/0172035 A1 * | 7/2012 | Parekh et al. .............. | 455/426.1 |
| 2012/0294173 A1 * | 11/2012 | Su et al. ......................... | 370/252 |
| 2013/0172023 A1 * | 7/2013 | Chan et al. .................... | 455/466 |
| 2013/0201850 A1 * | 8/2013 | Swaminathan et al. ...... | 370/252 |
| 2013/0258913 A1 * | 10/2013 | Challa et al. .................. | 370/280 |
| 2013/0260758 A1 * | 10/2013 | Zhao et al. ..................... | 455/436 |
| 2013/0267267 A1 * | 10/2013 | Mujtaba et al. ............... | 455/509 |
| 2013/0303181 A1 * | 11/2013 | Rajurkar et al. ........... | 455/452.1 |
| 2013/0303240 A1 * | 11/2013 | Sanka et al. .................. | 455/558 |
| 2013/0331077 A1 * | 12/2013 | Mucke et al. ................. | 455/418 |
| 2014/0044046 A1 * | 2/2014 | Vangala et al. ............... | 370/328 |

* cited by examiner

*Primary Examiner* — Min Jung

(57) ABSTRACT

A method and apparatus to help minimize tuneaway time of a user equipment device (UE), by dynamically scheduling when the UE should tune away to scan for coverage of a particular wireless communication system, such as a time division duplex (TDD) system for instance. The UE may receive downlink transmissions from a TDD system and determining a downlink transmission schedule of the TDD system based on when those downlink transmissions occurred. Further, the UE may then use the determined downlink transmission schedule as a basis to schedule tuneaway of the UE from a serving system to scan for coverage of the TDD system.

20 Claims, 5 Drawing Sheets

METHOD AND APPARATUS FOR DYNAMICALLY SCHEDULED TUNEAWAY

BACKGROUND

Unless otherwise indicated herein, the materials described in this section are not prior art to the claims and are not admitted to be prior art by inclusion in this section.

A typical cellular wireless system includes a number of base stations that radiate to define wireless coverage areas, such as cells and cell sectors, in which user equipment devices (UEs), such as cell phones, tablet computers, tracking devices, embedded wireless modules, and other wirelessly equipped communication devices, can operate. In turn, each base station is typically coupled with equipment that provides connectivity with one or more transport networks, such as the public switched telephone network (PSTN) and/or the Internet for instance. With this arrangement, a UE operating within a coverage area of any base station can engage in air interface communication with the base station and can thereby communicate via the base station with various remote network entities or with other UEs served by the base station.

In general, a cellular wireless system may operate in accordance with a particular air interface protocol or "radio access technology," with communications from the base stations to UEs defining a downlink (or forward link) and communications from the UEs to the base stations defining an uplink (or reverse link). Examples of existing air interface protocols include CDMA (e.g., 1xRTT and 1xEV-DO), LTE (e.g., FDD LTE and TDD LTE), WiMAX, iDEN, TDMA, AMPS, GSM, GPRS, UMTS, EDGE, MMDS, WI-FI, and BLUETOOTH. Each protocol may define its own procedures for initiation of calls, handoff between coverage areas, and functions related to air interface communication.

Further, air interface communications in each coverage area of a cellular wireless system may be encoded or carried in a manner that distinguishes the communications in that coverage area from communications in adjacent coverage areas. For example, in a CDMA system, each coverage area has a respective pseudo-random noise offset or "PN offset" that is used to encode or modulate air interface communications in the coverage area distinctly from those in adjacent coverage areas. And in an LTE system, each coverage area has a respective identifier ("cell ID" or "sector ID") that is broadcast in a synchronization signal to distinguish the coverage area from adjacent coverage areas. Analogously, in other air interface protocols, communications in one sector may be distinguished from those in other sectors by frequency, time, and/or various other parameters.

To enable a UE to select an appropriate coverage area in which to operate, the base stations in a cellular wireless system may be arranged to broadcast in each of their coverage areas a respective pilot signal (or "reference signal"). In practice, a UE may then scan for and evaluate the strength of any detected the pilot signals, and the UE may then seek to operate in the coverage area providing the strongest pilot signal.

When a UE first powers on, the UE may go through this scanning process to select an initial coverage area in which to operate. Further, when the UE is operating in a particular coverage area, the UE may continue to monitor the pilot signal of that coverage area as well as the pilot signals of other coverage areas, to help ensure that the UE continues to operate in the coverage area providing the best coverage. In particular, if the UE detects a sufficiently strong pilot from another coverage area, the UE may then hand off from operating in its current coverage area to operating in the other coverage area.

Moreover, in some cases, more than one air interface protocol might be implemented in a given market area. For example, a given market area might provide both 3G CDMA coverage and also 4G LTE coverage. And as another example, a given market area might provide both FDD LTE coverage and TDD LTE coverage. In an area that provides two or more air interface protocols, a UE might not only hand off between coverage areas under a common air interface protocol but might also hand off between coverage areas of different air interface protocols, such as between 3G CDMA coverage and 4G LTE coverage, or between FDD LTE coverage and TDD LTE coverage.

OVERVIEW

When a UE is operating in a particular coverage area and seeks to evaluate the strength of coverage available in one or more other coverage areas, the UE may need to temporarily pause its operation in its serving coverage area while it tunes away to scan for the other coverage. This pause in operation may be necessary, for instance, if the serving coverage area operates on a different carrier frequency than the one or more other coverage areas, as the UE may need to tune away from its serving carrier frequency to scan for coverage on one or more other carrier frequencies. Further, the pause in operation may be necessary if the serving coverage area operates on a different air interface protocol than the one or more other coverage areas, as the UE may need to switch between radio interfaces in order to scan for coverage on one or more other air interface protocols.

Pausing the UE's operation in its serving coverage area, however, can be problematic, as the pause may disrupt the flow of the UE's communication in that coverage area. This is especially so if the UE is engaged in an active data communication, as the disruption in flow of the UE's communication may result in overall reduced data throughput. Furthermore, even if the UE is not engaged in an active communication, pausing operation in the serving coverage area may cause the UE to miss important page messages or other control messages transmitted in the serving coverage area. Consequently, the duration of the UE's tuneaway should be as short as possible.

Under certain air interface protocols, each coverage area continuously provides a respective pilot signal, and so when a UE tunes away to scan for coverage under such a protocol, the UE may quickly receive and evaluate one or more pilot signals before returning to operate in its serving coverage area. An example of such a coverage area is one operating in a frequency division duplex (FDD) manner, such as the FDD LTE protocol for instance. In an FDD coverage area, downlink communications and uplink communications use separate carrier frequencies, and so downlink communications including a pilot signal may be continuous.

Under other air interface protocols, however, each coverage area provides a respective pilot signal only intermittently, rather than continuously, and so when a UE tunes away to scan for coverage under such a protocol, the UE may need to wait until a coverage area next provides its pilot signal before the UE can receive and evaluate that signal. An example of such a coverage area is one operating in a time division duplex (TDD) manner, such as the TDD LTE protocol for instance. In a TDD coverage area, downlink communications and uplink communications may use the same carrier frequency but are separated from each other in time, such as by repeated alternating between a number of uplink sub-frames and a number of downlink sub-frames. In such a coverage area, the pilot signal may only exist during times of downlink communication. Consequently, if the UE tunes away from its serving coverage area to scan for TDD coverage at a time when a TDD coverage area happens to be engaged in uplink communication, the UE may need to wait for the TDD coverage area to begin its next downlink transmission before the UE can evaluate its coverage.

Disclosed herein is a method and apparatus to help minimize a UE's tuneaway time, by dynamically scheduling when the UE should tune away to scan for coverage of a particular wireless communication system, such as a TDD system for instance.

The disclosed method may involve a UE receiving downlink transmissions from a TDD system and the UE determining a downlink transmission schedule of the TDD system based on when those downlink transmissions occurred. Further, the method may then involve the UE using the determined downlink transmission schedule as a basis for scheduling tuneaway of the UE from a serving system to scan for coverage of the TDD system.

Alternatively, the disclosed method may more generally involve a UE receiving downlink transmissions from a wireless communication system and the UE determining a downlink transmission schedule of the wireless communication system based on when those downlink transmissions occurred. In turn, the method may then involve the UE using the determined downlink transmission schedule as a basis for scheduling tuneaway of the UE from a serving system to scan for coverage of the wireless communication system.

Further, the disclosed apparatus may take the form of a wireless communication device (WCD) having an antenna structure for engaging in air interface communication with base stations, a processing unit, non-transitory data storage, and program logic stored in the data storage and executable by the processing unit to carry out various functions. The functions may include monitoring downlink transmissions received via the antenna structure from a TDD system and determining, based on when the downlink transmissions were received, a downlink transmission schedule of the TDD system. Further, the functions may include, based on the determined downlink transmission schedule of the TDD system, establishing a schedule for the WCD to tune away from a serving system to scan for coverage of the TDD system. And the functions may then further include causing the WCD to tune away from the serving system to scan for coverage of the TDD system, in accordance with the established schedule.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
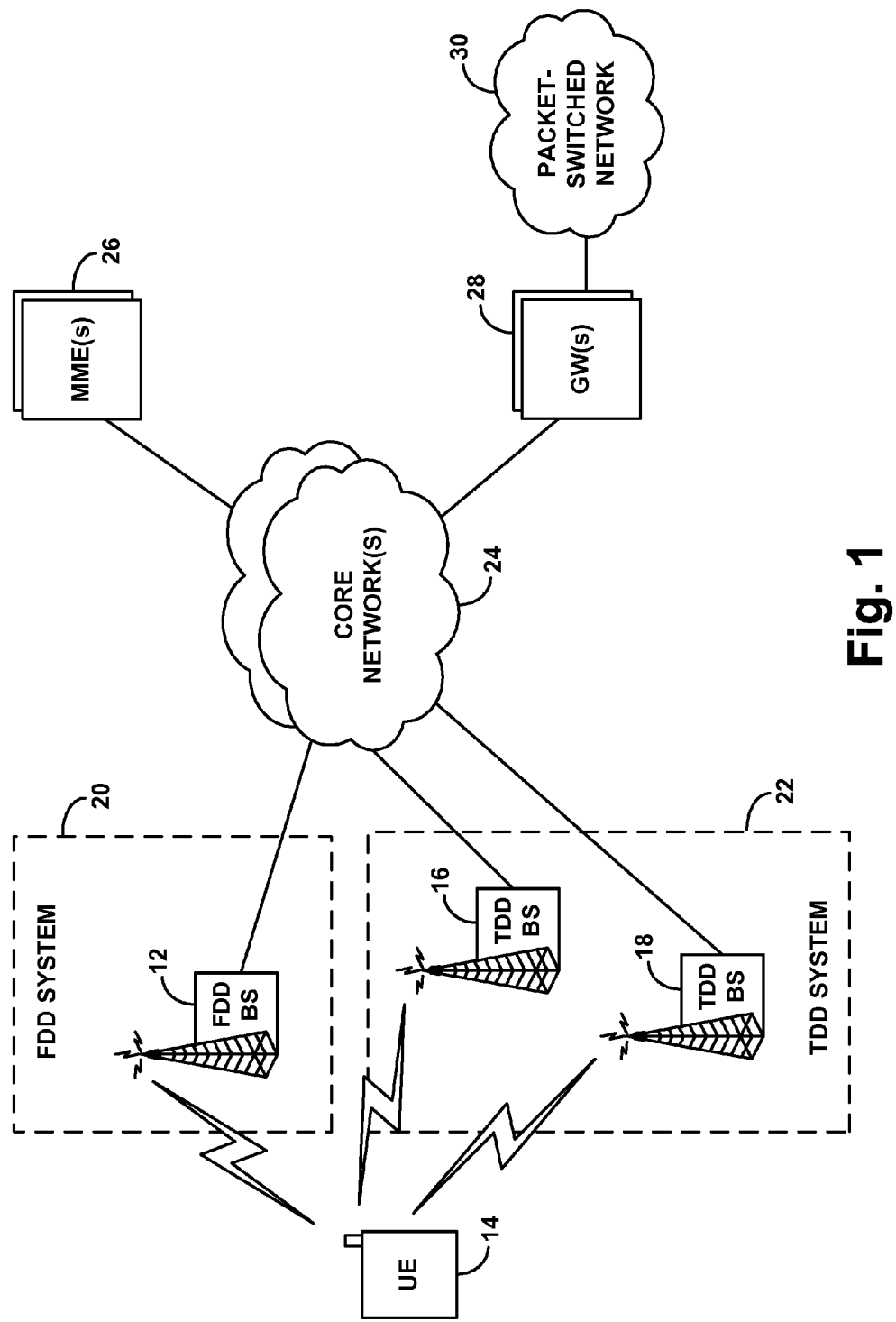
FIG. 1 is a simplified block diagram of an example network arrangement in which embodiments of the present method can be implemented.

The present method and apparatus will be described by way of example in a scenario where a UE is operating under FDD LTE and will scan for TDD LTE coverage. We may assume in this scenario that the UE does not receive data that specifies the downlink transmission schedule used by the TDD LTE system. Instead, the UE may dynamically determine the downlink transmission schedule of the TDD LTE system by actually monitoring when the TDD LTE system engages in downlink transmission.

Referring to the drawings, as noted above, FIG. 1 is a simplified block diagram depicting an example network arrangement in which embodiments of the present method can be implemented.

As shown, the example network includes a base station 12 that is currently serving a UE 14 with FDD LTE coverage, and the network further includes two other base stations 16, 18 that provide TDD LTE coverage in the vicinity of the UE. In LTE parlance, these base stations are known as "eNodeBs," but this description will continue to refer to them more generally as "base stations." In this simplified arrangement, serving base station 12 may be considered to define an example FDD system 20, and the other base stations 16, 18 may be considered to define an example TDD system 22.

In practice, these base stations 12, 16, 18 may all be owned and/or operated by the same wireless service provider. Alternatively, the base stations may be owned and/or operated by separate wireless service providers or others. Further, the base stations may take various forms, such as macro base stations (typically with antenna towers covering large public areas) or pico/femto base stations (of the type typically taking up less space and serving much smaller areas). In any event, each base station may include one or more antenna arrangements and associated equipment, for radiating to define one or more coverage areas in which to serve UEs such as UE 12, and may further include backhaul connections for coupling with other network equipment.

As further shown, base stations 12, 16, 18 are communicatively linked with one or more core networks 24, which may be operated by the one or more wireless service providers. Core network(s) 24 then provide connectivity with one or more mobility management entities (MMES) 26 and one or more gateways (GWs) 28, which in turn provide connectivity with a packet-switched network 30 such as the Internet.

In practice, the MME(s) 26 may function as a signaling controller to facilitate setup of data communication sessions and the like via an appropriate gateway 28, interworking with one or more base stations in the process. For instance, when a UE is operating in an idle mode (Radio Resource Control (RRC) idle mode) within a base station coverage area and the MME has seeks to page the UE, the MME may direct the base station (and perhaps one or more other base stations in a common tracking area) to page the UE. Further, when the UE seeks to engage in bearer data communication, the UE may transmit an RRC connection request to the base station, the base station may assign a temporary identifier to the UE for use in air interface resource block allocation, the UE may transition to the RRC connected mode, and the MME may set up an access bearer between the base station and the gateway to facilitate packet data communication.

As noted above, in the example scenario, base station 12 is currently serving UE 14 with FDD LTE coverage. As such, downlink air interface communications from base station 12 to UE 14 may occur on one carrier frequency (e.g., a 5 MHz channel or perhaps an aggregate of 5 MHz channels), while uplink air interface communications from UE 14 to base station 12 may occur simultaneously on a separate carrier frequency (e.g., one or more other 5 MHz channels). In accordance with a recent version of LTE, the downlink air interface defines a continuum of radio frames, each 10 milliseconds long, and each radio frame is divided into 10 subframes each 1 millisecond long. Each subframe then carries a number of resource blocks across the downlink bandwidth, and each resource block is divided into a number of resource elements (e.g., each 67 microseconds by 15 kHz) carrying orthogonal frequency division multiplexed (OFDM) symbols. Distributed among the resource elements and transmitted in every subframe are then symbols that define an LTE reference signal. Thus, in the FDD LTE coverage area provided by base station 12, downlink communication is substantially continuous, with the reference signal (pilot signal) provided in each subframe.

Figure 2:
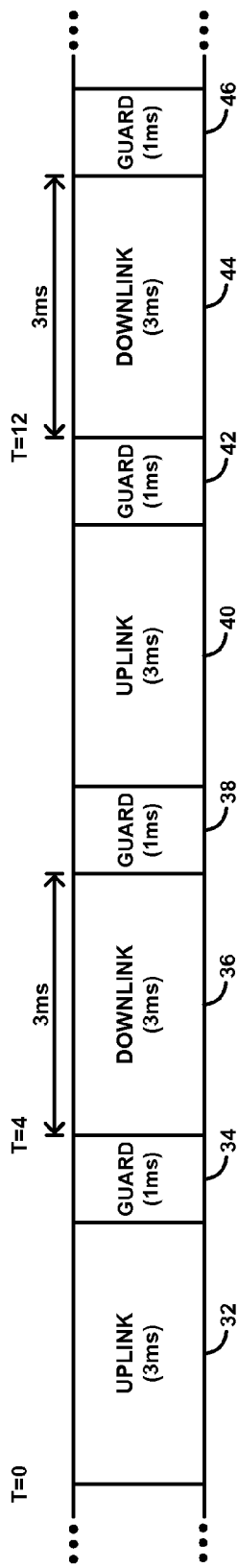
FIG. 2 is a timing diagram of a repeating portion of an example TDD air interface.

In contrast, base stations 16, 18 provide TDD LTE coverage. As such, downlink communication is discontinuous, repeatedly alternating over time with uplink communication on a common carrier frequency (e.g., a common 5 MHz channel or aggregate of such channels). FIG. 2 is a timing diagram depicting an example of that alternation. As shown in FIG. 2, the TDD LTE air interface may include a group of uplink subframes (e.g., 2, 3 or 4 subframes) 32, a guard period (e.g., one subframe) 34, a group of downlink subframes 36, another guard period 38, another group of uplink subframes 40, another guard period 42, another group of downlink subframes 44, and another guard band 46, and the air interface may repeatedly continue in this manner over time.

As with the FDD LTE coverage area, a TDD LTE coverage area provides a reference signal in each downlink subframe. However, because downlink communication in the TDD LTE coverage area is intermittent, the reference signal is also intermittent. Consequently, while UE 14 is being served by base station 12 and tunes away to scan for coverage on the carrier frequency used by base station 16 for instance, there is a chance that the UE will tune away during an uplink portion of the TDD LTE air interface provided by base station 16, in which case the UE may need to wait to receive and evaluate a reference signal from base station 16, which would not happen until the next downlink portion of the TDD LTE air interface.

Note that the arrangement shown in FIG. 2 is specifically intended to be an example, as the illustrated arrangement may not necessarily represent the timing used by a given TDD LTE system. Indeed, the present method is arranged to account for the fact that a UE may not know the downlink transmission schedule of a given TDD LTE system a priori, by having the UE dynamically determine the downlink transmission schedule by monitoring the actual downlink transmission timing.

In practice, a UE may carry out this monitoring and scheduling function autonomously or in response to a scanning directive from a base station serving the UE at the time (possibly base station 12).

To facilitate this, when the UE is operating in coverage of a serving base station, the serving base station may broadcast an overhead LTE message (e.g., in an LTE system information block such as "SIB5") listing one or more carrier frequencies in use by one or more coverage areas in the area and perhaps specifying for each carrier frequency whether the frequency is used by a TDD system or by an FDD system. In practice, when the UE is served by a given base station or perhaps even when the UE is first searching for a base station to serve the UE, the UE may read a broadcast list such as this to determine carrier frequencies in use in the area. The UE may then scan for coverage on each such carrier frequency and measure signal strength (e.g., signal strength per se and/or signal quality such as signal to noise ratio or error rate) of any such detected coverage. In turn, the UE may then use the measured signal strength as a basis to autonomously select a coverage area in which to operate, or the UE may transmit to a serving base station one or more radio measurement reports that indicate the measured signal strength, and the serving base station may use the reported signals strength as a basis to decide whether to direct the UE to hand off to particular detected coverage.

Furthermore, when the UE is operating in coverage of a particular serving base station, the UE may regularly monitor signal strength from that serving base station and may regularly transmit to the serving base station radio measurement reports that indicate the measured signal strength. Based on one or more such reports, and perhaps consideration of other factors such as load, the serving base station may then transmit to the UE a directive for the UE to begin scanning for other coverage. The UE may then refer to a broadcast list of carrier frequencies in the area and may scan for coverage on those carrier frequencies and report detected coverage in one or more radio measurement reports to the serving base station as discussed above.

When a UE scans for coverage of a given TDD system, the UE may carry out the presently disclosed process of monitoring the TDD system to determine actual timing of its downlink transmission. In particular, the UE may tune to the carrier frequency at issue and determine when an LTE reference signal is present on the carrier frequency and when the LTE reference signal is not present on the carrier frequency, and the UE may thereby discern and record when the TDD system provides downlink transmission and when it does not. To facilitate this determination, the UE may first read one or more sync frames broadcast by the TDD system, to determine a reference time (T=0) for the TDD system. In turn, the UE may then monitor for presence and absence of the reference signal and thereby determine, with respect to the reference time, when downlink transmission occurs and when downlink transmission does not occur. As this analysis is from the perspective of the UE, the times at issue may be receive times, but we may consider those receive times to be representative of downlink transmission times.

Considering the arrangement shown in FIG. 2, for instance, the UE may determine that downlink transmission (represented by the presence of an LTE reference signal) starts at time T=4 and lasts 3 milliseconds, that there is then a 5 millisecond break in downlink transmission (represented by a 5 millisecond absence of the LTE reference signal), that downlink transmission then occurs again starting at time T=12 and again lasts for 33 milliseconds, and that this pattern repeats. Given this, the UE may then record in its data storage that the TDD system at issue starts downlink transmission at 4 milliseconds after reference time and then alternates between 3 milliseconds of downlink transmission and five milliseconds of no downlink transmission.

With the benefit of this information, the UE may then schedule timing of its tune away from a serving base station (perhaps a different serving base station) for purposes of scanning for coverage of the TDD system. In particular, the UE may schedule itself to tune away to the TDD system when the TDD system will be engaging in downlink transmission, particularly in one of the 3 millisecond segments that the UE earlier identified. The UE may then apply that schedule by tuning away and measuring reference signal coverage of one or more coverage areas in the TDD system when the TDD system is engaging in downlink transmission, so that the UE can avoid a delay in tuning to such a system and waiting for the system to engage in downlink transmission before evaluating coverage of the system. Alternatively, the UE could tune away before the time that the UE determined the TDD system will provide downlink transmission, and the UE may scan one or more other systems and then turn to scan the TDD system at the determined time. Other arrangements are possible as well.

In a representative LTE implementation, various TDD LTE coverage areas in a given market may apply synchronized downlink transmission timing, i.e., all coverage areas of the TDD LTE system may use the same subframes for downlink transmission, then the same subframes for uplink transmission, and so forth. With such an arrangement, a UE could monitor the actual downlink transmission timing in one coverage area of the TDD system and could then use that timing as a basis to schedule when the UE will tune away to scan for coverage of any one or more coverage areas in the TDD system, possibly including but not limited to the TDD coverage area that the UE monitored in the first place.

In the arrangement of FIG. 1, for instance, the UE may monitor the downlink transmission from base station 16 to determine and record a downlink transmission schedule for TDD system 22. Thereafter, when the UE is scanning for TDD coverage perhaps from base station 18, the UE may then tune to scan for that coverage in accordance with the determined downlink transmission schedule for TDD system 22. Likewise, the UE may first monitor the downlink transmission timing on one carrier frequency (e.g., one or more frequency channels) on which the TDD system operates, and the UE may then tune away in accordance with the determined downlink transmission schedule to scan for coverage under another carrier frequency on which the TDD system operates.

Figure 3:
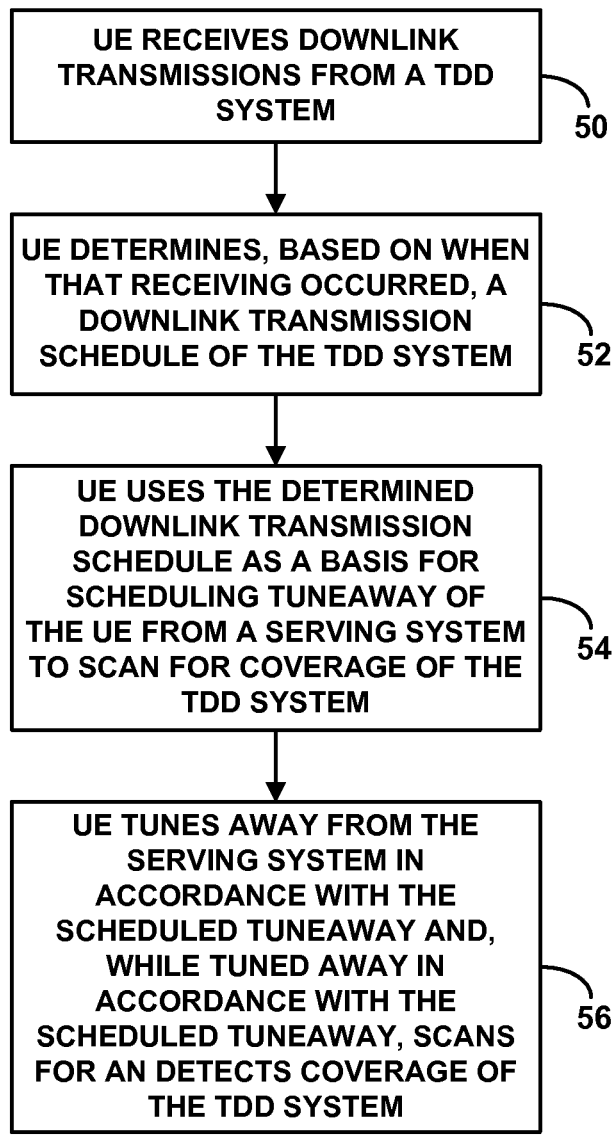
FIG. 3 is a flow chart depicting functions that can be carried out in accordance with the method.

Turning now to FIG. 3, a flow chart is provided to further illustrate functions that can be carried out in accordance with the present method. As shown in FIG. 3, at block 50, the method involves a UE receiving downlink transmissions from a TDD system. At block 52, the method then involves the UE determining, based on when that receiving occurred, a downlink transmission schedule of the TDD system. And at block 54, the method involves the UE using the determined downlink transmission schedule as a basis for scheduling tuneaway of the UE from a serving system to scan for coverage of the TDD system. And at block 56, the method involves the UE tuning away from the serving system in accordance with the scheduled tuneaway and, while tuned away in accordance with the scheduled tuneaway, scanning for and detecting coverage of the TDD system. In practice, the UE may then report the detected coverage of the TDD system to its serving system and may hand off from the serving system to the TDD system.

In line with the discussion above, the TDD system may define an air interface that alternates between downlink communication and uplink communication. In that case, the act of determining the downlink transmission schedule may be based on both when the receiving of the downlink transmissions occurred and when the receiving of the downlink transmissions did not occur.

Advantageously, the act of the UE using the downlink transmission schedule as a basis for scheduling tuneaway of the UE from the serving system to scan for coverage of the TDD system may occur while the UE is in a connected mode being served by the serving system. That way, the method can help to minimize the amount of time the UE will be tuned away to scan for coverage of the TDD system.

Moreover, the act of receiving the downlink transmissions from the TDD system and determining the downlink transmission schedule of the TDD system may occur during one or more periods of the UE tuning away from the serving system. In practice, for instance, if the UE tunes away periodically to scan for such coverage, the UE may monitor and determine the downlink transmission schedule of the TDD system in one instance of tuning away and may then advantageously make use of the determined downlink transmission schedule in a subsequent instance of tuning away.

This method may be especially advantageous in a scenario where the serving system from which the UE tunes away to scan for TDD coverage is an FDD system, as the UE served by that FDD system may have no a priori information about downlink timing of the TDD system in the area. In particular, the UE may not receive any overhead signal or other data specifying the downlink transmission schedule of the TDD system. This may be the case particularly if the FDD system and TDD system are operated by different wireless service providers.

In practice, the UE may also make use of its scheduled tuneaway, by informing its serving system of when the UE will be tuning away, so as to cause the serving system to appropriate schedule transmissions to the UE. For instance, the UE may transmit a control message to its current serving system to notify the serving system when the UE will be tuning away in accordance with the scheduled tuneaway, and the serving system may respond by not scheduling transmission to the UE concurrently with the scheduled tuneaway. That way, while the UE is tuned away to scan for coverage of the TDD system, the UE may not miss certain transmissions from the serving system.

Figure 4:
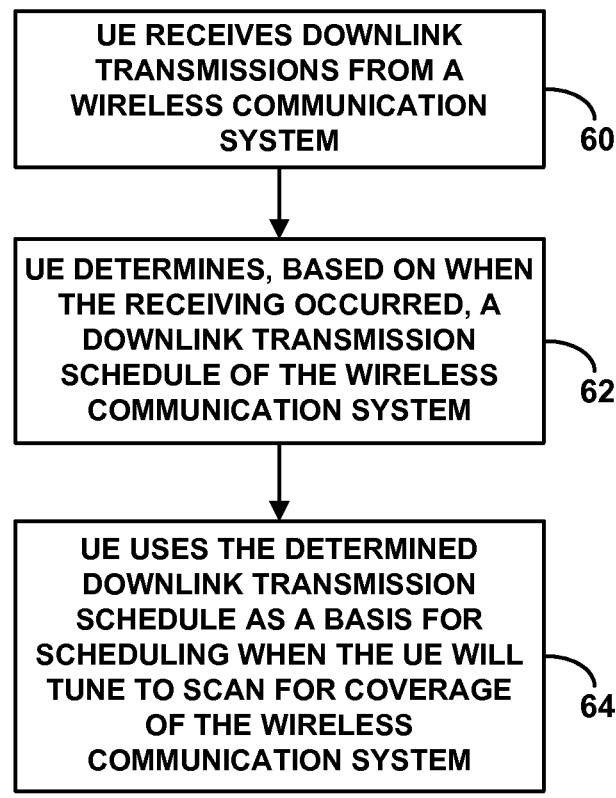
FIG. 4 is another flow chart depicting functions that can be carried out in accordance with the method.

Turning next to FIG. 4, a more generalized flow chart is provided to further illustrate functions that can be carried out in accordance with the present method, not necessarily limited to scanning of a TDD system but perhaps useful in other scenarios where a target system provides relevant downlink transmissions only at particular times such that determining and using a downlink transmission schedule would still be beneficial.

As shown in FIG. 4, at block 60, the method involves a UE receiving downlink transmissions from a wireless communication system as a general matter. At block 62, the method then involves the UE determining, based on when the receiving occurred, a downlink transmission schedule of the wireless communication system. And at block 64, the method involves the UE using the determined downlink transmission schedule as a basis for scheduling when the UE will tune to scan for coverage of the wireless communication system, such as when the UE will tune away to scan for such coverage and/or when the UE will tune to the wireless communication (e.g., to one or more carrier frequencies of the wireless communication system) to scan for such coverage.

Figure 5:
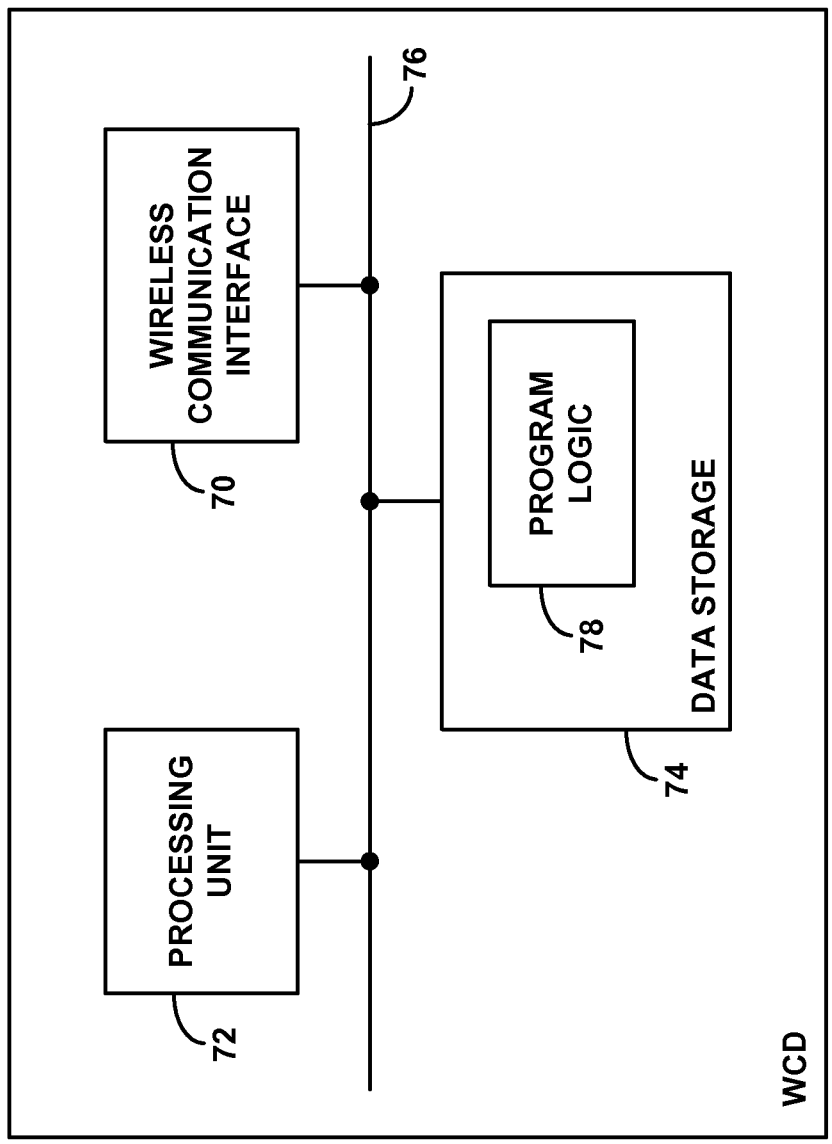
FIG. 5 is a simplified block diagram of a UE that may carry out aspects of the method.

Finally, FIG. 5 is a simplified block diagram depicting an example wireless communication device (WCD) arranged to carry out various functions of the present method. Such a WCD may function as the UE 14 shown in FIG. 1 for instance and may implement many of the functions described above.

As shown in FIG. 5, the example WCD includes a wireless communication interface 70, a processing unit 72, data storage 74, all of which may be communicatively linked together by a system bus, network, or other connection mechanism 76. Variations from this arrangement are of course possible as well, including addition and omission of elements, combination of elements, and distribution of elements in any of a variety of ways.

In the arrangement shown, wireless communication interface 70 may function to engage in air interface communication with base stations such as those shown in FIG. 1. As such, the wireless communication interface may include an antenna structure and a chipset arranged to support wireless communication according to one or more air interface protocols, such as those discussed above for instance.

Processing unit 72 may comprise one or more general purpose processors (e.g., microprocessors) and/or more special purpose processors (e.g., application specific integrated circuits or the like) and may be integrated in whole or in part with wireless communication interface 70. Data storage 74 may then comprise one or more volatile and/or non-volatile storage components, particularly non-transitory storage, such as magnetic, optical, or flash memory for instance, and may be integrated in whole or in part with processing unit 72. Data storage may also or alternatively be provided separately, as a non-transitory machine readable medium.

As shown, data storage 74 may hold (e.g., contain, store, or be encoded with) program logic 78 (e.g., machine language instructions or other program instructions, markup or the like) executable by the processing unit to carry out various functions described herein. In practice, for instance, those functions may include monitoring downlink transmissions received via the wireless communication interface 70 from a time division duplex (TDD) system and determining, based on when the downlink transmissions were received, a downlink transmission schedule of the TDD system. Further, the functions may include, based on the determined downlink transmission schedule of the TDD system, establishing a schedule for the WCD to tune away from a serving system to scan for coverage of the TDD system. And the functions may include causing the WCD to tune away from the serving system to scan for coverage of the TDD system (e.g., by instruction to the wireless communication interface), in accordance with the established schedule.

In line with the discussion above, the WCD may determine the downlink transmission schedule of the TDD system based on both when the downlink transmissions were received by the WCD and when the downlink transmissions were not received by the WCD. Further, the WCD may carry out the various functions in a scenario where the serving system is a FDD system and where both the serving system and the TDD system are LTE systems. In that case, the received downlink transmissions may comprise received reference signal transmissions, and the act of tuning away to scan for coverage of the TDD system may comprise tuning away to scan for further reference signal transmission of the TDD system. Moreover, the monitoring of the downlink transmissions received from the TDD system and determination of the downlink transmission schedule may occur while the WCD is in an RRC connected mode with the serving system, and the tuning away to scan for coverage of the TDD system may also occur when the WCD is in the RRC connected mode with the serving system.

Exemplary embodiments have been described above. Those skilled in the art will appreciate, however, that changes may be made from the described embodiments without departing from the intended scope.

We claim:

1. A method comprising:
receiving, by a user equipment device (UE), downlink transmissions from a time division duplex (TDD) system;
determining, by the UE, based on timing of the receiving of the downlink transmissions, a downlink transmission schedule of the TDD system; and
using, by the UE, the determined downlink transmission schedule as a basis for scheduling tuneaway of the UE from a serving system to scan for coverage of the TDD system.

2. The method of claim 1, wherein the TDD system defines an air interface that alternates between downlink communication and uplink communication, and wherein the determining is based on both when the receiving of the downlink transmissions occurred and when the receiving of the downlink transmissions did not occur.

3. The method of claim 1, wherein the using occurs while the UE is in a connected mode being served by the serving system.

4. The method of claim 1, wherein receiving the downlink transmissions from the TDD system and determining the downlink transmission schedule of the TDD system occurs during one or more periods of the UE tuning away from the serving system.

5. The method of claim 1, wherein the serving system is a frequency division duplex (FDD) system.

6. The method of claim 1, wherein the UE does not receive data specifying the downlink transmission schedule of the TDD system.

7. The method of claim 1, further comprising the UE informing the serving system of the scheduled tuneaway to cause the serving system to not schedule transmission to the UE concurrently with the scheduled tuneaway.

8. The method of claim 1, further comprising:
tuning away, by the UE, from the serving system in accordance with the scheduled tuneaway; and
while tuned away in accordance with the scheduled tuneaway, scanning for and detecting, by the UE, coverage of the TDD system.

9. The method of claim 8, wherein the TDD system comprises a plurality of base stations, wherein the downlink transmissions are from a given one of the base stations, and wherein scanning for and detecting coverage of the TDD system comprises detecting coverage of another one of the base stations.

10. The method of claim 8, wherein the TDD system operates on a plurality of carrier frequencies, wherein the downlink transmissions are on a given one of the carrier frequencies, and wherein scanning for and detecting coverage of the TDD system comprises detecting coverage on another one of the carrier frequencies.

11. The method of claim 8, wherein the TDD system is a Long Term Evolution (LTE) system broadcasting one or more reference signals, wherein receiving the downlink transmissions from the TDD system comprises receiving at least one of the one or more reference signals from the TDD system, and wherein scanning for and detecting coverage of the TDD system comprises detecting at least one of the one or more reference signals.

12. The method of claim 8, further comprising:
reporting, by the UE, to the serving system, the detected coverage of the TDD system.

13. The method of claim 12, further comprising:
handing off, by the UE, from the serving system to the TDD system.

14. A method comprising:
receiving, by a user equipment device (UE), downlink transmissions from a wireless communication system;
determining, by the UE, based on timing of the receiving of the downlink transmissions, a downlink transmission schedule of the wireless communication system; and using, by the UE, the determined downlink transmission schedule as a basis for scheduling tuning of the UE to scan for coverage of the wireless communication system.

15. A wireless communication device (WCD) comprising:
a wireless communication interface for engaging in air interface communication with base stations;
a processing unit;
non-transitory data storage;
program logic stored in the data storage and executable by the processing unit to carry out functions comprising:
(a) monitoring downlink transmissions received via the wireless communication interface from a time division duplex (TDD) system and determining, based on timing of when the downlink transmissions were received, a downlink transmission schedule of the TDD system;
(b) based on the determined downlink transmission schedule of the TDD system, establishing a schedule for the WCD to tune away from a serving system to scan for coverage of the TDD system; and
(c) causing the WCD to tune away from the serving system to scan for coverage of the TDD system, in accordance with the established schedule.

16. The WCD of claim 15, wherein determining the downlink transmission schedule of the TDD system is based on both when the downlink transmissions were received by the WCD and when the downlink transmissions were not received by the WCD.

17. The WCD of claim 15, wherein the serving system is a frequency division duplex (FDD) system, and wherein both the serving system and the TDD system are Long Term Evolution (LTE) systems.

18. The WCD of claim 17, wherein the received downlink transmissions comprise received reference signal transmissions, and wherein tuning away to scan for coverage of the TDD system comprises tuning away to scan for further reference signal transmission of the TDD system.

19. The WCD of claim 17, wherein the WCD operates in a Radio Resource Control (RRC) connected mode with the serving system when the WCD tunes away to scan for coverage of the TDD system.

20. The WCD of claim 19, wherein the WCD operates in the RRC connected mode when the serving system when the WCD monitors the downlink transmissions received from the TDD system and determines the downlink transmission schedule of the TDD system.

* * * * *